United States Patent [19]
Kyrtsos

[11] Patent Number: 5,900,819
[45] Date of Patent: May 4, 1999

[54] DROWSY DRIVER DETECTION SYSTEM

[75] Inventor: Christos T. Kyrtsos, Southfield, Mich.

[73] Assignee: Meritor Heavy Vehicle Systems, LLC

[21] Appl. No.: 09/063,574

[22] Filed: Apr. 21, 1998

[51] Int. Cl.[6] .................................................. G08B 23/00
[52] U.S. Cl. ........................................ 340/576; 180/272
[58] Field of Search .................................. 340/576, 575,
340/669, 439; 701/70; 180/272, 282; 73/514.01;
280/5.508

[56] References Cited

U.S. PATENT DOCUMENTS

| | | | |
|---|---|---|---|
| 5,383,680 | 1/1995 | Bock et al. | 280/5.508 X |
| 5,539,397 | 7/1996 | Asanuma et al. | 340/901 |
| 5,709,281 | 1/1998 | Sherwin et al. | 180/272 |
| 5,798,695 | 8/1998 | Metalis et al. | 340/576 |

*Primary Examiner*—Thomas Mullen

[57] ABSTRACT

A system for detecting a drowsy driver includes an axle with a sensor for measuring the movement of the axle and for producing an axle signal. The sensor typically measures any or all of the following: the lateral acceleration of the axle, the fore-aft acceleration of the axle, or the vehicle speed. A central processing unit compares the axle signal derived from the sensor measurements to a pre-determined drowsy threshold and an indicator indicates to the driver that drowsiness has been detected when the axle signal exceeds the pre-determined drowsy threshold.

25 Claims, 2 Drawing Sheets

DROWSY DRIVER DETECTION SYSTEM

BACKGROUND OF THE INVENTION

This application relates to a unique system for detecting a drowsy driver of a vehicle by using axle sensors to measure and monitor the movements of the vehicle and driving patterns of the driver.

Driver drowsiness often progresses in stages. When a driver first begins to feel sleepy his eyes may involuntarily close or his head may begin to tilt forward or backward for a few seconds. As the driver experiences these initial drowsiness stages, the vehicle may begin to slightly weave back and forth on the road or may slow down and speed up. The driver is usually able to wake himself up in time to regain control of his vehicle before an accident results. As the driver becomes more sleepy, the time intervals that occur between the time when the eyes are closed and when the driver wakes himself up increase in length. This causes the weaving and speed changes to become more pronounced. Eventually the driver becomes so tired that he actually falls into a deeper sleep from which he cannot easily wake himself up. Thus, it is important to be able to detect the initial stages of drowsiness and alert the driver to this condition before the driver falls into this deeper sleep.

Various methods have been used to detect driver drowsiness. These methods can be placed into two basic categories, those methods that monitor the physical movements of the driver himself, and those methods that monitor the movement of certain vehicle components. Methods that utilize monitoring devices for the driver himself include mechanisms that are physically attached to the driver's body to monitor eye movement and the angle of the driver's head. As an example, mechanisms have been proposed which are attached to the vehicle within the passenger compartment and use infrared lens technology to monitor driver eye movement. These mechanisms are not practical. Many of these systems encounter difficulties in adjusting to different driver heights and also have difficulty in adjusting to drivers who assume various seating postures while driving.

Methods that detect drowsiness by monitoring the movement of a vehicle component include methods that monitor steering wheel turn angles. Such methods monitor steering wheel angle changes that occur as the steering wheel is rotated by the driver. Drowsiness is detected when the steering wheel is rotated through a specific set of pre-determined steering angles. These systems are often expensive and require additional hardware to be installed on the vehicle.

Thus, it is desirable to have an inexpensive system for detecting a drowsy driver of a vehicle that utilizes current vehicle components and sensors. It is also desirable to have a system that does not require physical attachment to or monitoring of the driver's body, and which is easily installed and maintained.

SUMMARY OF THE INVENTION

A unique system for detecting a drowsy driver of a vehicle includes providing at least one axle with at least one sensor for measuring the movement of the axle. Typically, the axle is a non-drive front steering axle, however the system can be utilized on any vehicle axle. Further, when the term axle is used in this application, it should be understood to extend to components mounted on the axle, such as the wheels, etc. The sensor can measure any or all of the following axle movements: vehicle speed, lateral axle acceleration, or fore-aft axle acceleration. Once the sensor has measured at least one of these movements, an axle signal is produced and sent to a central processing unit for comparison to a pre-determined drowsy threshold. An indicator indicates to a driver that drowsiness has been detected when the axle signal exceeds the pre-determined drowsy threshold.

The preferred inventive method for detecting a drowsy driver of a vehicle provides at least one axle having a sensor. Movement of the axle is measured by the sensor. An axle signal is produced in response to measuring the movement of the axle and the axle signal is compared to a pre-determined drowsy threshold. Finally, it is indicated to the driver that drowsiness has been detected if the acceleration signal exceeds the pre-determined drowsy threshold.

By measuring and monitoring specific axle movements, the present invention can easily detect the existence of driver drowsiness. Moreover, the system is easily installed, easily maintained and is relatively inexpensive. These and other features can be understood from the following specification and drawings.

DETAILED DESCRIPTION OF THE PREFERRED EMBODIMENT

Figure 1:
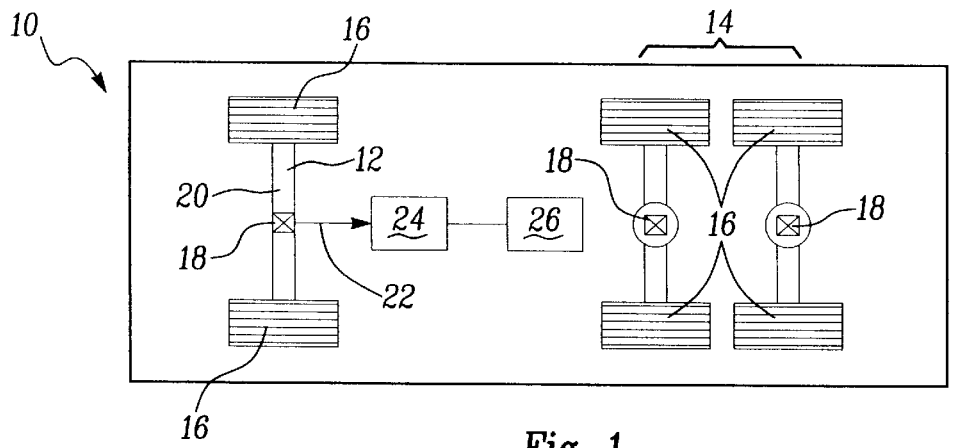
FIG. 1 is an overhead view of a vehicle using the inventive system.

A vehicle is shown generally at 10 in FIG. 1. The vehicle typically includes a front non-drive steering axle 12 and a rear drive tandem axle 14. The axles 12, 14 support the vehicle 10 on the road via wheels 16. A sensor 18 is placed adjacent to an axle center 20 on the front non-drive steering axle 12. The sensor 18 measures movement of the front non-drive steering axle 12.

The sensor 18 can be configured to monitor various different axle characteristics. Typically, the sensor can measure any or all of the following: the lateral acceleration of the axle 12, the fore-aft acceleration of the axle 12, or the vehicle speed. The sensor 18 is preferably placed near the axle center 20; alternatively, it may be placed off-center. However, the data collected may have to be adjusted to account for the imbalance. Also, the sensor is preferably placed on the front non-drive steering axle 12, however, the sensor could be placed on any axle in the vehicle. Also, the inventive system could utilize multiple sensors 18 on multiple axles.

When the sensor measures a particular characteristic of the axle 12, an axle signal 22 is produced and sent to a central processing unit 24. The axle signal is compared to a pre-determined drowsy threshold and an indicator 26 indicates to the driver that drowsiness has been detected if the axle signal exceeds the pre-determined drowsy threshold. The indicator 26 can be either a visual display located in the passenger compartment of the vehicle and/or an audio device.

In the preferred embodiment, the axle signal 22 is produced as a result of data compiled from the sensor 18 for lateral acceleration, fore-aft acceleration, and vehicle speed. However, it should be understood that the driver drowsiness can be detected by measuring only one of these axle characteristics or any combination thereof. Also, the axle signal can be produced based on any other types of axle and/or vehicle characteristics that could be measured by sensor 18.

Figure 2:
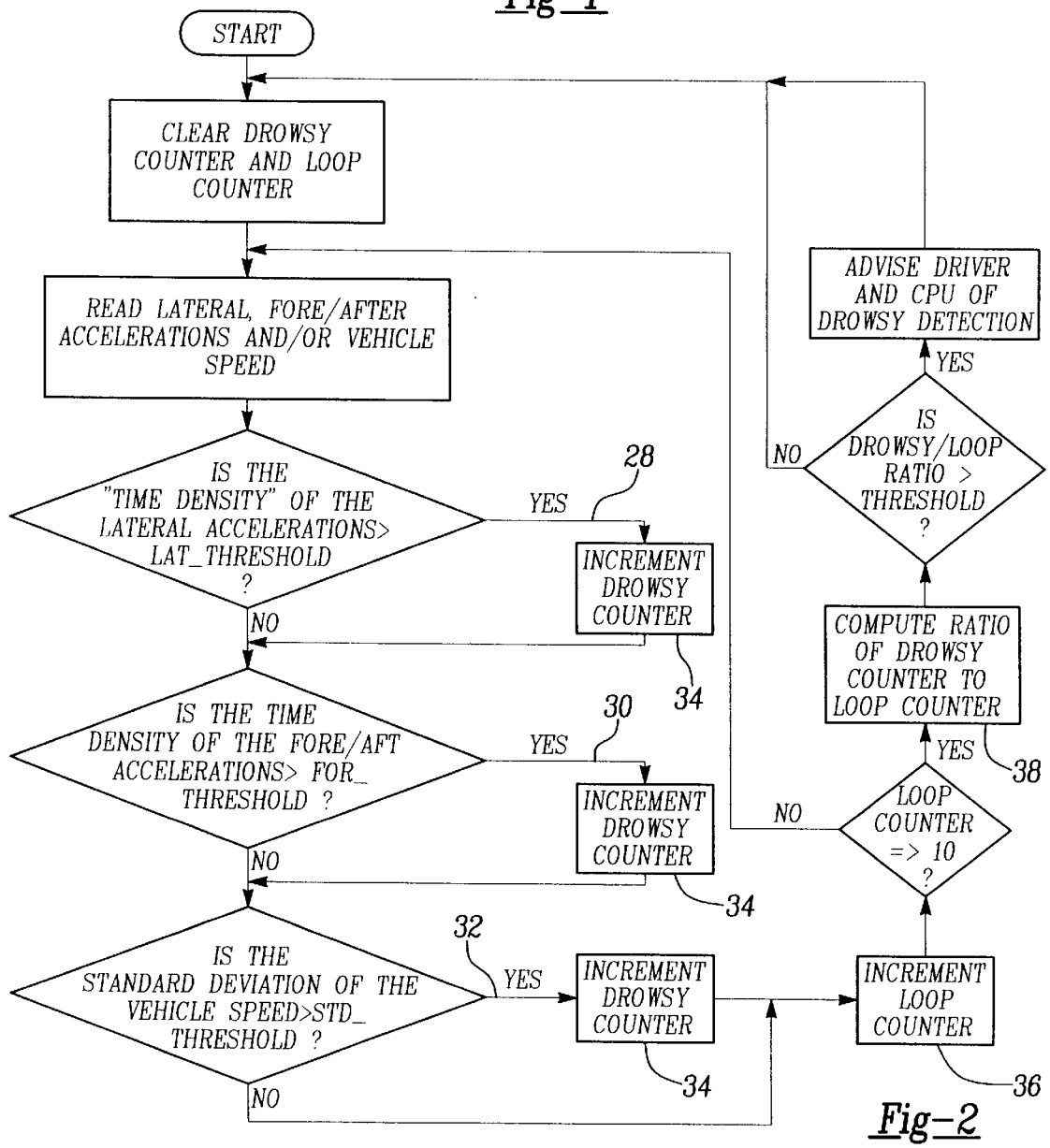
FIG. 2 is a flowchart describing the inventive method.

The inventive method is described in greater detail below and is shown in a flowchart in FIG. 2. Preferably, the sensor 18 is a standard accelerometer which measures axle accelerations and is well known in the art. An acceleration signal is produced in response to measuring the acceleration of the axle 12 and the axle signal is ultimately derived from the acceleration signal. The lateral and/or fore-aft accelerations of the axle are typically measured by the accelerometer 18.

A lateral acceleration signal 28 is produced when the lateral acceleration of the axle 12 is measured. Usually, a plurality of lateral accelerations of the axle are measured over a pre-determined lateral acceleration time interval. A lateral acceleration time density is determined by counting the number of times the measured lateral accelerations exceed a pre-determined lateral acceleration threshold during the pre-determined lateral acceleration time interval. The lateral acceleration signal 28 is produced if the lateral acceleration time density exceeds a lateral time density threshold. The acceleration signal is produced if the lateral acceleration signal 28 exceeds the lateral acceleration threshold.

A fore-aft acceleration signal 30 is produced when the fore-aft acceleration of the axle 12 is measured. Usually, a plurality of fore-aft accelerations of the axle are measured over a pre-determined fore-aft acceleration time interval. A fore-aft acceleration time density is determined by counting the number of times the measured fore-aft accelerations exceed a pre-determined fore-aft acceleration threshold during the pre-determined fore-aft acceleration time interval. The fore-aft acceleration signal 30 is produced if the fore-aft acceleration time density exceeds a fore-aft time density threshold. The acceleration signal is produced if the lateral acceleration signal 28 exceeds the lateral acceleration threshold and/or the fore-aft acceleration signal 30 exceeds the fore-aft acceleration signal.

Additionally, the speed of the vehicle can be measured and monitored by conventional methods. A speed signal 32 is produced based on the measured vehicle speed. Usually, a plurality of vehicle speeds are measured over a pre-determined speed time interval. A standard deviation of the vehicle speed is determined for the pre-determined speed time interval and the speed signal is produced if the standard deviation of the vehicle speed exceeds a speed standard deviation threshold. The speed signal 32 is compared to a pre-determined speed threshold, and the acceleration signal is produced if the lateral acceleration signal 28 exceeds the lateral acceleration threshold, the fore-aft acceleration signal 30 exceeds the fore-aft acceleration signal, and/or the speed signal 30 exceeds the speed threshold.

A drowsy count is produced by incrementing a drowsy counter 34 each time the lateral acceleration signal 28 exceeds the lateral acceleration threshold, the fore-aft acceleration signal 30 exceeds the fore-aft acceleration signal, or the speed signal 32 exceeds the speed threshold. Thus, if each of the conditions exceeds its associated threshold level then the drowsy counter would be incremented three (3) times. Further, a loop counter 36 is incremented each time the lateral acceleration, fore-aft acceleration, and vehicle speed is measured to produce a loop count. Thus, after the lateral acceleration, the fore-aft acceleration, and the vehicle speed are measured, the loop counter is incremented one (1) time.

The loop count is then compared to a pre-determined minimum requirement, for example ten (10) times (meaning ten sets of measurements), and the axle signal is derived from the acceleration signal if the loop count exceeds or equals the pre-determined minimum requirement. An additional set of measurements for the lateral acceleration, fore-aft acceleration, and vehicle speed is taken each time the loop count is less than the pre-determined minimum requirement. The use of ten measurement sets is just exemplary, it should be understood that more or less than ten measurement sets could be used.

After all the lateral acceleration signal 28, the fore-aft acceleration signal 30, and the speed signal 32 have been produced, the axle signal is derived from these signals 28, 20, 32 by determining a ratio 38 of the drowsy count to the loop count. This ratio 38 is then compared to the pre-determined drowsy threshold, and an indication is made to the driver that drowsiness has been detected if the ratio 38 exceeds the pre-determined drowsy threshold.

Once the pre-determined minimum requirement is achieved, either an indication is made to the driver that he is drowsy or if the drowsy threshold is not exceeded, no indication is made to the driver. Either way, the drowsy counter 34 and the loop counter 36 are re-initialized and the process repeats itself.

Figure 3A:
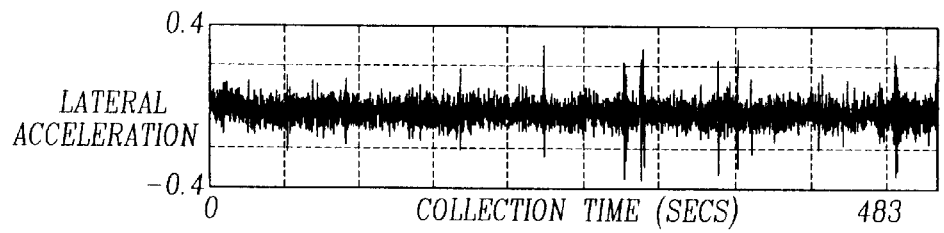
FIG. 3A represents lateral acceleration data taken from a non-drowsy driver test run.
Figure 3B:
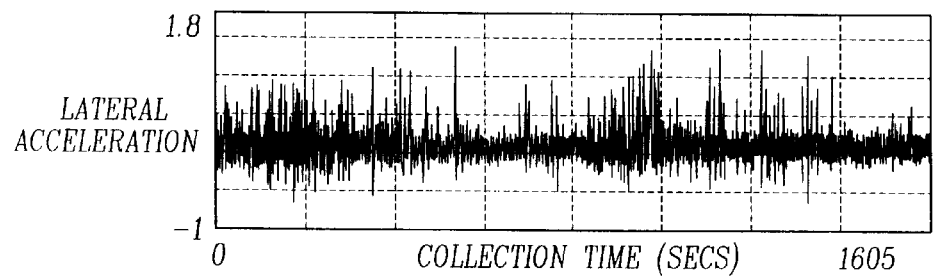
FIG. 3B represents lateral acceleration data taken from a drowsy driver test run.

Test data was collected for non-drowsy driver and drowsy driver trial runs. FIG. 3A shows lateral acceleration test data collected for a non-drowsy driver trial run. As shown, the lateral accelerations for the test interval varies between a maximum of plus or minus 0.4 g's with the majority of the test data varying between plus or minus 0.2 g's. When compared to the lateral acceleration test data collected for a drowsy driver, shown in FIG. 3B, a dramatic difference is shown. The lateral acceleration variance increases significantly in magnitude and varies between plus or minus 1.8 g's with the majority of data varying between plus or minus 1 g. However, as shown in FIG. 3B, the frequency of the lateral accelerations measured between 1.5 and 1.8 greatly increases with the drowsy driver test data.

Figure 4A:
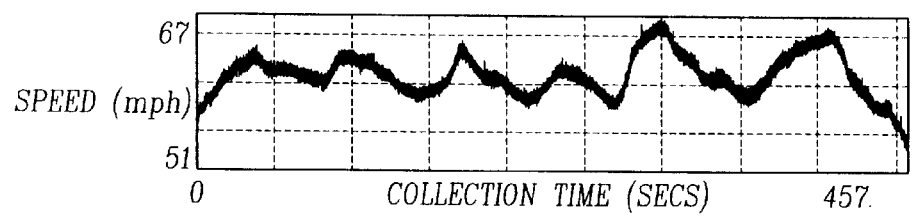
FIG. 4A represents speed data taken from a non-drowsy driver test run.
Figure 4B:
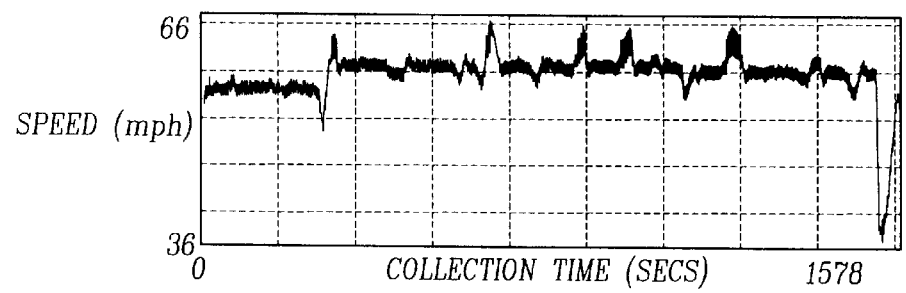
FIG. 4B represents speed data taken from drowsy-driver test run.

FIGS. 4A and 4B exemplify the vehicle speed test data collected during non-drowsy and drowsy driver test runs, respectively. FIG. 4A shows the variation in speed (miles per hour) over a given time interval. In the non-drowsy driver data the speed variation, the line thickness, is approximately one (1) mile per hour. In the drowsy driver test data the speed variation increases to three (3) miles per hour which is shown by the increase in thickness of the line.

The test data discussed above was compiled inadvertently during a road test for monitoring the effect of wheel misalignment. An accelerometer was in place on the front axle to monitor wheel misalignment but the data collected also showed the initial stages of driver drowsiness. The increased frequency and magnitude in the spikes for the lateral acceleration test data, for example, show the slight weaving back and forth on the road that the vehicle experienced when the driver began to feel sleepy.

This simple system and method for detecting driver drowsiness utilizes existing vehicle components and is relatively easy and inexpensive to maintain. The system is beneficial because it continually monitors driving patterns based on axle movement and indicates to the driver when initial drowsiness is detected before the driver actually falls into a deeper sleep.

Preferred embodiments of this invention have been disclosed, however, a worker of ordinary skill in the art would recognize that certain modifications would come within the scope of this invention. For that reason the following claims should be studied to determine the true scope and content of this invention.

I claim:

1. A method for detecting a drowsy driver of a vehicle comprising the steps of:

1) providing at least one axle having a sensor;
   2) measuring movement of the axle with the sensor;
   3) producing an axle signal in response to measuring the movement of the axle;
   4) comparing the axle signal to a pre-determined drowsy threshold; and
   5) indicating to the driver that drowsiness has been detected if the axle signal exceeds the pre-determined drowsy threshold.

2. A method as recited in claim 1 further including the steps of:

providing an accelerometer as the sensor;
   producing an acceleration signal in response to measuring the acceleration of the axle; and
   deriving the axle signal from the acceleration signal.

3. A method as recited in claim 2 further including the steps of measuring the lateral acceleration of the axle to produce a lateral acceleration signal,
   comparing the lateral acceleration signal to a pre-determined lateral acceleration threshold, and
   producing the acceleration signal if the lateral acceleration signal exceeds the lateral acceleration threshold.

4. A method as recited in claim 3 further including the steps of measuring a plurality of lateral accelerations of the axle over a pre-determined lateral acceleration time interval,
   determining a lateral acceleration time density by counting the number of times the measured lateral accelerations exceed the pre-determined lateral acceleration threshold during the pre-determined lateral acceleration time interval, and
   producing the lateral acceleration signal if the lateral acceleration time density exceeds a lateral time density threshold.

5. A method as recited in claim 3 further including the steps of measuring the fore-aft acceleration of the axle to produce a fore-aft acceleration signal,
   comparing the fore-aft acceleration signal to a pre-determined fore-aft acceleration threshold, and
   producing the acceleration signal if the lateral acceleration signal exceeds the lateral acceleration threshold or the fore-aft acceleration signal exceeds the fore-aft acceleration signal.

6. A method as recited in claim 5 further including the steps of measuring a plurality of fore-aft accelerations of the axle over a pre-determined fore-aft acceleration time interval,
   determining a fore-aft acceleration time density by counting the number of times the measured fore-aft accelerations exceed the pre-determined fore-aft acceleration threshold during the pre-determined fore-aft acceleration time interval, and
   producing the fore-aft acceleration signal if the fore-aft acceleration time density exceeds a fore-aft time density threshold.

7. A method as recited in claim 5 further including the steps of producing a speed signal based on vehicle speed,
   comparing the speed signal to a pre-determined speed threshold, and
   producing the acceleration signal if the lateral acceleration signal exceeds the lateral acceleration threshold, the fore-aft acceleration signal exceeds the fore-aft acceleration signal, or the speed signal exceeds the speed threshold.

8. A method as recited in claim 7 further including the steps of measuring a plurality of vehicle speeds over a pre-determined speed time interval,
   determining a standard deviation of the vehicle speed for the pre-determined speed time interval, and
   producing the speed signal if the standard deviation of the vehicle speed exceeds a speed standard deviation threshold.

9. A method as recited in claim 7 further including the step of producing a drowsy count by incrementing a drowsy counter each time the lateral acceleration signal exceeds the lateral acceleration threshold, the fore-aft acceleration signal exceeds the fore-aft acceleration signal, or the speed signal exceeds the speed threshold.

10. A method as recited in claim 9 further including the steps of incrementing a loop counter each time the lateral acceleration, fore-aft acceleration, and vehicle speed is measured to produce a loop count, comparing the loop count to a pre-determined minimum requirement, and deriving the axle signal from the acceleration signal if the loop count exceeds or equals the pre-determined minimum requirement.

11. A method as recited in claim 10 further including the step of taking an additional set of measurements for the lateral acceleration, fore-aft acceleration, and vehicle speed each time the loop count is less than the pre-determined minimum requirement.

12. A method as recited in claim 10 further including the steps of producing the axle signal by determining a ratio of the drowsy count to the loop count, comparing the ratio to the pre-determined drowsy threshold, and indicating to the driver that drowsiness has been detected if the ratio exceeds the pre-determined drowsy threshold.

13. A method as recited in claim 1 further including the steps of:

measuring a plurality of vehicle speeds over a pre-determined speed time interval with the sensor,
   determining a standard deviation of the vehicle speed for the predetermined speed time interval,
   producing a speed signal if the standard deviation of the vehicle speed exceeds a speed standard deviation threshold; and
   eriving the axle signal from the speed signal.

14. A method as recited in claim 13 further including the steps of providing an accelerometer as the sensor,
   producing a lateral acceleration signal in response to measuring the lateral acceleration of the axle;
   comparing the lateral acceleration signal to a pre-determined lateral acceleration threshold; and
   deriving the axle signal from the speed and lateral acceleration signals.

15. A method as recited in claim 14 further including the steps of producing a fore-aft acceleration signal in response to measuring the fore-aft acceleration of the axle;

comparing the fore-aft acceleration signal to a pre-determined fore-aft acceleration threshold; and deriving the axle signal from the speed, lateral acceleration, and fore-aft signals.

16. A method as recited in claim 15 further including the step of producing a drowsy count signal by incrementing a drowsy counter each time the speed signal exceeds the speed standard deviation threshold, the lateral acceleration signal exceeds the pre-determined lateral acceleration threshold, or the fore-aft acceleration signal exceeds the pre-determined fore-aft acceleration threshold.

17. A method as recited in claim 16 further including the steps of producing a loop count signal by incrementing a loop counter each time the lateral acceleration, fore-aft acceleration, and vehicle speed is measured, comparing the loop count signal to a pre-determined minimum requirement, and comparing the axle signal to the pre-determined drowsy threshold if the loop count signal exceeds or equals the pre-determined minimum requirement.

18. A method as recited in claim 17 further including the steps of producing the axle signal by determining a ratio of the drowsy count signal to the loop count signal, comparing the axle signal to the pre-determined drowsy threshold, and indicating to the driver that drowsiness has been detected if the axle signal exceeds the pre-determined drowsy threshold.

19. A system for detecting a drowsy driver of a vehicle comprising:

at least one axle;

at least one sensor for measuring the movement of said axle and producing an axle signal;

a processor for comparing said axle signal to a pre-determined drowsy threshold; and an indicator for indicating to a driver that drowsiness has been detected when said axle signal exceeds said pre-determined drowsy threshold.

20. A system as recited in claim 19 wherein said sensor is an accelerometer for measuring the accelerations of said axle.

21. A system as recited in claim 19 wherein said axle includes an axle center, said sensor being supported on said axle adjacent said axle center.

22. A system as recited in claim 19 wherein said axle is a steering axle.

23. A system as recited in claim 19 wherein at least one axle is comprised of a plurality of axles, each supporting a sensor for measuring the movement of said respective axle and producing a respective axle signal.

24. A system as recited in claim 19 wherein said indicator is a visual display.

25. A system as recited in claim 24 wherein said indicator additionally includes an audio component.

* * * * *